US011580255B2

(12) United States Patent
Podal et al.

(10) Patent No.: US 11,580,255 B2
(45) Date of Patent: Feb. 14, 2023

(54) SECURITY TOOL FOR N-TIER PLATFORMS

(71) Applicant: Bank of America Corporation, Charlotte, NC (US)

(72) Inventors: Savitri Jaganath Podal, Mumbai (IN); Jyotiranjan Mohapatra, Hyderabad (IN); Vishal Patangia, West Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 414 days.

(21) Appl. No.: 16/680,103

(22) Filed: Nov. 11, 2019

(65) Prior Publication Data

US 2021/0141925 A1    May 13, 2021

(51) Int. Cl.
| | |
|---|---|
| *G06F 21/62* | (2013.01) |
| *G06F 21/57* | (2013.01) |
| *G06F 11/32* | (2006.01) |
| *G06F 11/30* | (2006.01) |
| *G06F 11/07* | (2006.01) |

(52) U.S. Cl.
CPC ...... *G06F 21/6245* (2013.01); *G06F 11/0772* (2013.01); *G06F 11/302* (2013.01); *G06F 11/327* (2013.01); *G06F 21/57* (2013.01)

(58) Field of Classification Search
CPC .. G06F 21/6245; G06F 21/57; G06F 11/0772; G06F 11/302; G06F 11/327
See application file for complete search history.

(56) References Cited

U.S. PATENT DOCUMENTS

| | | |
|---|---|---|
| 4,438,494 A | 3/1984 | Budde et al. |
| 4,503,535 A | 3/1985 | Budde et al. |
| 4,945,474 A | 7/1990 | Elliott et al. |
| 5,119,377 A | 6/1992 | Cobb et al. |
| 5,245,615 A | 9/1993 | Treu |
| 5,422,890 A | 6/1995 | Klingsporn et al. |
| 5,463,768 A | 10/1995 | Cuddihy et al. |
| 5,471,631 A | 11/1995 | Beardsley et al. |
| 5,615,335 A | 3/1997 | Onffioy et al. |
| 5,835,765 A | 11/1998 | Matsumoto |
| 5,892,898 A | 4/1999 | Fujii et al. |
| 6,473,659 B1 | 10/2002 | Shah et al. |
| 6,493,656 B1 | 12/2002 | Houston et al. |
| 6,598,179 B1 | 7/2003 | Chirashnya et al. |

(Continued)

FOREIGN PATENT DOCUMENTS

| | | | | |
|---|---|---|---|---|
| WO | WO-2015200508 A1 | * | 12/2015 | .......... G06F 11/0709 |
| WO | WO-2018141424 A1 | * | 8/2018 | .......... G06F 11/0766 |

*Primary Examiner* — Kristine L Kincaid
*Assistant Examiner* — Felicia Farrow

(57) ABSTRACT

An apparatus includes a memory and a hardware processor. The memory stores a plurality of logging rules. Each logging rule assigned to a tier of a multi-tier platform. The processor receives source code for an application configured to execute on a plurality of tiers of the multi-tier platform and detects, within the source code, an entry point and an exit point for a tier of the plurality of tiers. The processor determines, based on the plurality of logging rules, a first attribute that is to be logged during execution in the tier and a second attribute that is not to be logged during execution in the tier and inserts, between the entry point and the exit point in the source code, logging code that, when executed, logs the first attribute and hides the second attribute.

20 Claims, 3 Drawing Sheets

(56) References Cited

U.S. PATENT DOCUMENTS

| | | |
|---|---|---|
| 6,600,614 B2 | 7/2003 | Lenny et al. |
| 6,622,260 B1 | 9/2003 | Marisetty et al. |
| 6,629,060 B2 | 9/2003 | Okuno et al. |
| 6,658,591 B1 | 12/2003 | Arndt |
| 6,681,282 B1 | 1/2004 | Golden et al. |
| 6,690,595 B1 | 2/2004 | Srinivasan et al. |
| 6,757,837 B1 | 6/2004 | Platt et al. |
| 6,778,651 B1 | 8/2004 | Jost et al. |
| 6,782,495 B2 | 8/2004 | Bernklau-Halvor |
| 6,842,870 B2 | 1/2005 | Austen et al. |
| 6,948,094 B2 | 9/2005 | Schultz et al. |
| 7,100,084 B2 | 8/2006 | Unkle et al. |
| 7,103,542 B2 | 9/2006 | Doyle |
| 7,328,376 B2 | 2/2008 | McGuire et al. |
| 7,379,999 B1 | 5/2008 | Zhou et al. |
| 7,546,487 B2 | 6/2009 | Marisetty et al. |
| 7,653,652 B2 | 1/2010 | Kagalwala et al. |
| 7,721,266 B2 | 5/2010 | Frey et al. |
| 8,024,607 B2 | 9/2011 | Ladd et al. |
| 8,046,641 B2 | 10/2011 | Hernandez et al. |
| 8,332,695 B2 | 12/2012 | Dalphy et al. |
| 8,458,526 B2 | 6/2013 | Dalphy et al. |
| 8,499,280 B2 | 7/2013 | Davies et al. |
| 8,626,463 B2 | 1/2014 | Stevens et al. |
| 8,719,798 B2 | 5/2014 | Unger |
| 8,719,814 B2 | 5/2014 | Wookey |
| 9,424,115 B2 | 8/2016 | Jiang et al. |
| 10,025,659 B2 | 7/2018 | Shinde et al. |
| 10,078,579 B1 | 9/2018 | Joshi et al. |
| 10,108,802 B2 | 10/2018 | Lu et al. |
| 2005/0086243 A1* | 4/2005 | Abbott ............... G06F 16/40 |
| 2005/0149535 A1* | 7/2005 | Frey ............... G06F 11/3636 |
| 2005/0223283 A1* | 10/2005 | Frey ............... G06F 11/3636 714/20 |
| 2015/0302206 A1* | 10/2015 | Averdunk ........ G06F 21/6209 726/26 |

\* cited by examiner

SECURITY TOOL FOR N-TIER PLATFORMS

TECHNICAL FIELD

This disclosure relates generally to security for applications executing on multitier platforms.

BACKGROUND

Platforms can include multiple execution tiers (e.g., user interface, network, database, service, etc.). Software applications that execute on these platforms may execute in one or more tiers of the platform.

SUMMARY OF THE DISCLOSURE

Platforms can include multiple execution tiers (e.g., user device, network, database, service, etc.). Software applications that execute on these platforms may execute in one or more tiers of the platform. Each tier of the platform typically has different characteristics that result in different security concerns. For example, a user device may encounter direct interaction with a user, and this interaction may result in security vulnerabilities (e.g., keyloggers, phishing schemes, social engineering, etc.) on the device. The security vulnerabilities of the device may allow personal information of the user to be taken while the user interacts with the software application on the device. As another example, a network may be selective about the traffic allowed on the network, but certain security vulnerabilities (e.g., worms, malware, etc.) may result in certain undesired traffic to force its way onto the network and spread to connected devices. These network intrusions may result in personal information of a user communicated during execution of the software application being intercepted as it travels across the network.

Due to the architecture of a multitier platform, it may be very difficult to detect, track, and resolve security vulnerabilities. A user may report that personal information was taken when executing an application, but it may be difficult to determine whether the vulnerability originated in the user's device, the network, the server, the database, etc. Different teams may be deployed to triage the vulnerability, each team responsible for a certain tier of the platform. Each team has limited visibility into the functions of the other tiers and interactions with other tiers, which can result in security vulnerabilities being misdiagnosed or missed. Moreover, these teams may review logs for their respective tiers to determine security vulnerabilities, but the logging standards across tiers may not be uniform and as a result, certain teams may not have sufficient information to diagnose a security vulnerability in their respective tiers. As a result, the security vulnerabilities may go undetected and/or untreated.

This disclosure contemplates a security tool that improves the detection of security vulnerabilities by altering the source code of software applications that execute on multi-tier platforms. Generally, the security tool detects in the source code entry points and exit points into various tiers of the platform. The security tool then determines the attributes that should be logged during execution in that tier (e.g., to maximize the chances that security vulnerabilities will be detected) and inserts logging code into the source code between the entry point and exit point. In this manner, when the application is executed on a particular tier, the logging code will also be executed to log the appropriate attributes that will allow security vulnerabilities in that tier to be detected. The security tool may automatically adjust the source code of the application according to preset logging rules. In this manner, security vulnerabilities in the multitier platform and the application can be more easily detected.

According to an embodiment, an apparatus includes a memory and a hardware processor. The memory stores a plurality of logging rules. Each logging rule assigned to a tier of a multi-tier platform. The processor receives source code for an application configured to execute on a plurality of tiers of the multi-tier platform and detects, within the source code, an entry point and an exit point for a tier of the plurality of tiers. The processor determines, based on the plurality of logging rules, a first attribute that is to be logged during execution in the tier and a second attribute that is not to be logged during execution in the tier and inserts, between the entry point and the exit point in the source code, logging code that, when executed, logs the first attribute and hides the second attribute.

According to another embodiment, a method includes storing, by a memory, a plurality of logging rules. Each logging rule assigned to a tier of a multi-tier platform. The method also includes receiving, by a hardware processor communicatively coupled to the memory, source code for an application configured to execute on a plurality of tiers of the multi-tier platform and detecting, by the processor, within the source code, an entry point and an exit point for a tier of the plurality of tiers. The method further includes determining, by the processor, based on the plurality of logging rules, a first attribute that is to be logged during execution in the tier and a second attribute that is not to be logged during execution in the tier and inserting, by the processor, between the entry point and the exit point in the source code, logging code that, when executed, logs the first attribute and hides the second attribute.

According to yet another embodiment, a system includes a first tier, a second tier, a third tier, and a security tool. The first tier includes a user device. The second tier includes a network. The third tier includes a database. The security tool stores a plurality of logging rules. Each logging rule assigned to one of the first, second, and third tiers. The security tool receives source code for an application configured to execute on the first, second, and third tiers and detects, within the source code, an entry point and an exit point for each of the first, second, and third tiers. The security tool also determines, based on the plurality of logging rules, a first attribute that is to be logged during execution in the first tier and a second attribute that is not to be logged during execution in the first tier and inserts, between the entry point and the exit point in the source code, logging code that, when executed, logs the first attribute and hides the second attribute.

Certain embodiments provide one or more technical advantages. For example, an embodiment improves detection of security vulnerabilities in a multitier platform by inserting into source code of a software application logging code suitable for one or more tiers of the platform. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
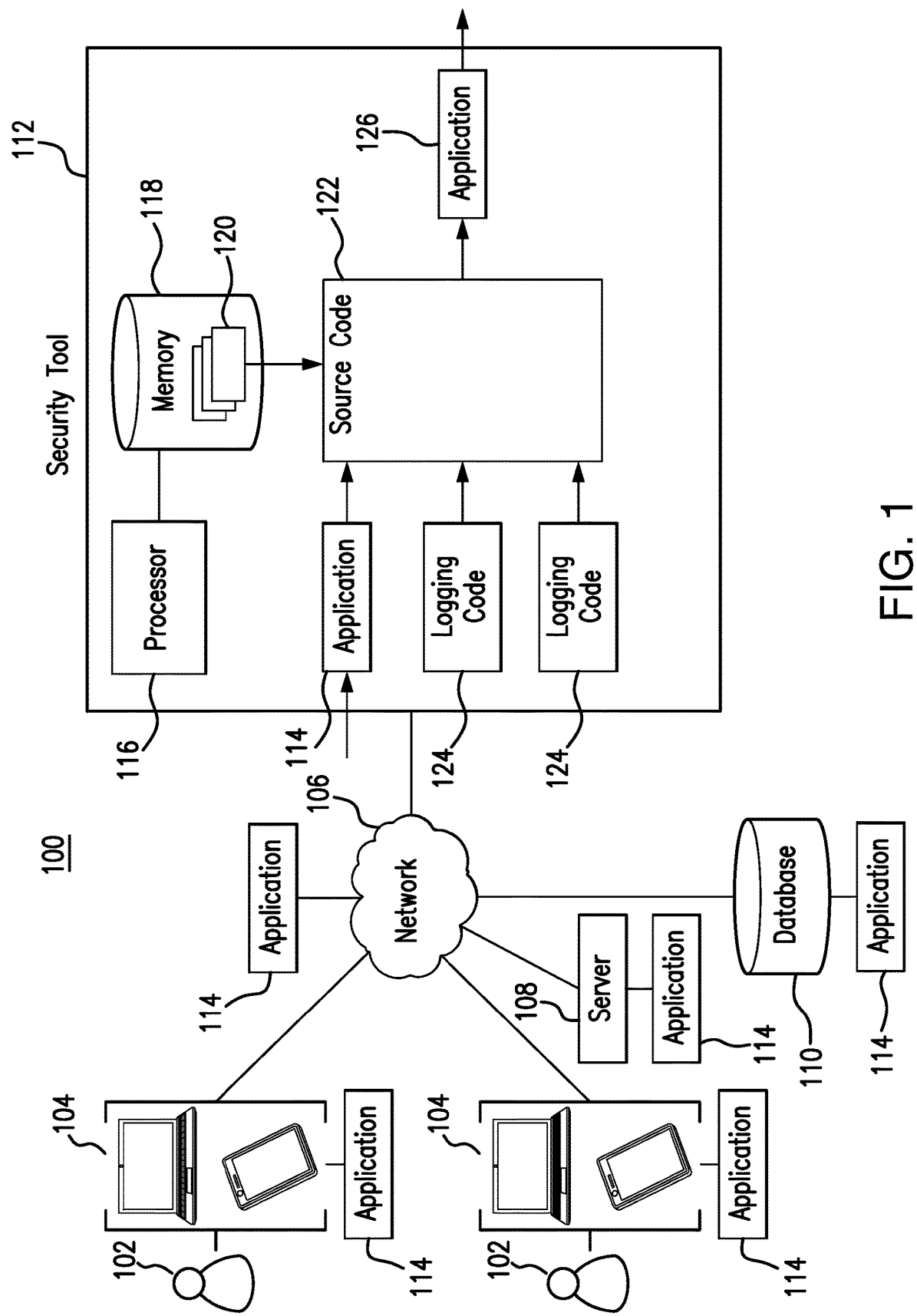
FIG. 1 illustrates an example system.
Figure 2:
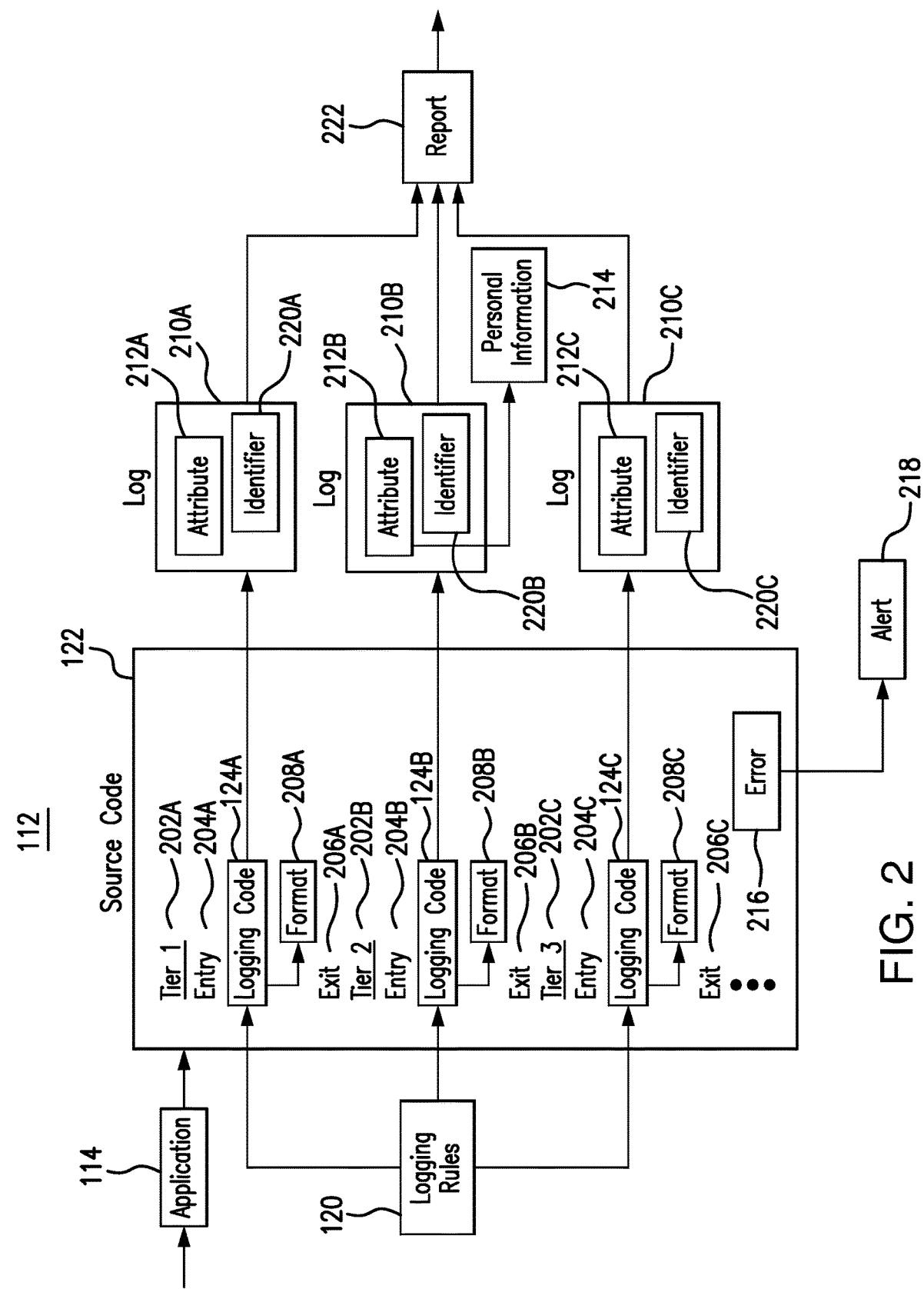
FIG. 2 illustrates an example security tool of the system of FIG. 1.
Figure 3:
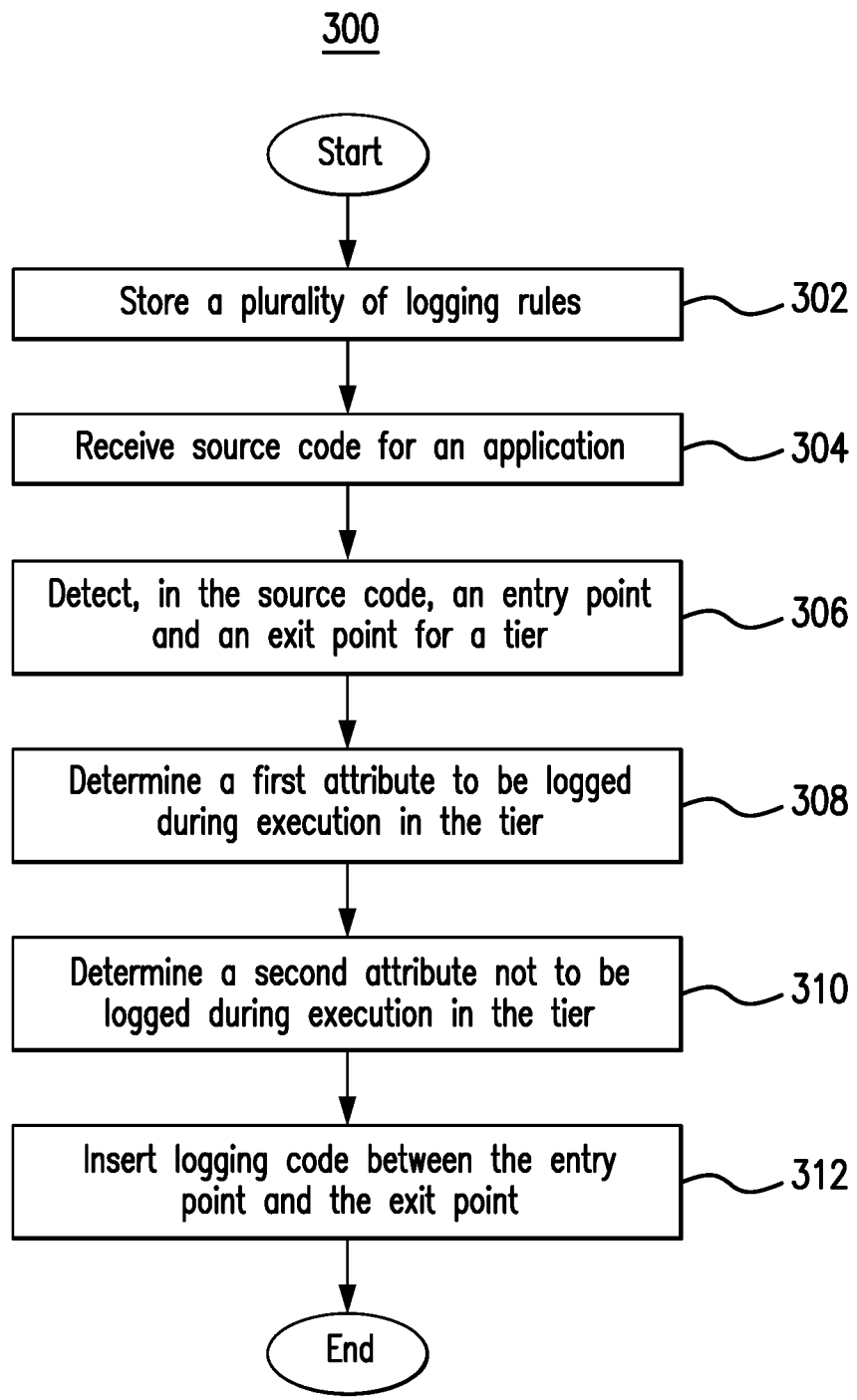
FIG. 3 is a flowchart illustrating a method for improving security using the system of FIG. 1.

Embodiments of the present disclosure and its advantages are best understood by referring to FIGS. 1 through 3 of the drawings, like numerals being used for like and corresponding parts of the various drawings.

Platforms can include multiple execution tiers (e.g., user device, network, database, service, etc.). These platforms may be referred to as "multitier platforms" or "N-tier platforms." Software applications that execute on these platforms may execute in one or more tiers of the platform. Each tier of the platform typically has different characteristics that result in different security concerns. For example, a user device may encounter direct interaction with a user, and this interaction may result in security vulnerabilities (e.g., keyloggers, phishing schemes, social engineering, etc.) on the device. The security vulnerabilities of the device may allow personal information of the user to be taken while the user interacts with the software application on the device. As another example, a network may be selective about the traffic allowed on the network, but certain security vulnerabilities (e.g., worms, malware, etc.) may result in certain undesired traffic to force its way onto the network and spread to connected devices. These network intrusions may result in personal information of a user communicated during execution of the software application being intercepted as it travels across the network.

Due to the architecture of a multitier platform, it may be very difficult to detect, track, and resolve security vulnerabilities. A user may report that personal information was taken when executing an application, but it may be difficult to determine whether the vulnerability originated in the user's device, the network, the server, the database, etc. Different teams may be deployed to triage the vulnerability, each team responsible for a certain tier of the platform. Each team has limited visibility into the functions of the other tiers and interactions with other tiers, which can result in security vulnerabilities being misdiagnosed or missed. Moreover, these teams may review logs for their respective tiers to determine security vulnerabilities, but the logging standards across tiers may not be uniform and as a result, certain teams may not have sufficient information to diagnose a security vulnerability in their respective tiers. As a result, the security vulnerabilities may go undetected and/or untreated.

This disclosure contemplates a security tool that improves the detection of security vulnerabilities by altering the source code of software applications that execute on multitier platforms. Generally, the security tool detects in the source code entry points and exit points into various tiers of the platform. The security tool then determines the attributes that should be logged during execution in that tier (e.g., to maximize the chances that security vulnerabilities will be detected) and inserts logging code into the source code between the entry point and exit point. In this manner, when the application is executed on a particular tier, the logging code will also be executed to log the appropriate attributes that will allow security vulnerabilities in that tier to be detected. The security tool may automatically adjust the source code of the application according to preset logging rules. In this manner, security vulnerabilities in the multitier platform and the application can be more easily detected and resolved. The security tool will be described in more detail using FIGS. 1 through 3.

FIG. 1 illustrates an example system 100. As seen in FIG. 1, system 100 includes one or more device 104, a network 106, a server 108, a database 110, and a security tool 112. Generally, system 100 adjusts source code for an application that executes in various portions or tiers of system 100. System 100 inserts logging code into the source code for the application so that when the application is executing in a particular portion or tier of system 100, the appropriate attributes are logged. These attributes may be reviewed to detect security vulnerabilities in particular tiers of system 100 in certain embodiments. As a result, system 100 improves the detection of security vulnerabilities in multitier platforms.

Users 102 use devices 104 to interact with other components of system 100. For example, devices 104 may execute application 114 to interact and/or communicate with other components of system 100. Application 114 may provide a user interface that allows user 102 to directly interact with application 114 and/or device 104. Application 114 may cause device 104 to communicate messages to other components of system 100. Other components of system 100 may also communicate messages to device 104. Application 114 may interpret these messages and display results on device 104 for user 102.

Users 102 may introduce security vulnerabilities through devices 104. For example, users 102 may unintentionally or unknowingly download malware, keyloggers, worms, and viruses onto devices 104, which jeopardize the security of the personal information of users 102. Devices 104 may even propagate these security threats to other components of system 100. Due to the personal nature of devices 104, it may be difficult to detect these security vulnerabilities.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. In some embodiments, an application executed by device 104 may perform the functions described herein.

Network 106 may facilitate the communication of messages throughout system 100. Application 114 may also execute on network 106 to facilitate the communication of messages throughout system 100. For example, application 114 may facilitate the handling of network traffic caused by application 114. Application 114 may be executed by components in network 106 such as, for example, gateways, routers, and modems. Application 114 may execute on these components to direct the network traffic generated by application 114.

Security vulnerabilities may also exist on network 106. For example, network 106 may control the flow of network traffic throughout system 100, which includes preventing undesired network traffic from entering network 106. Malicious users, however, may breach network 106 and introduce undesired or malicious network traffic that infects other components of system 100. In some cases, these intrusions and their effects may be difficult to detect.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Server 108 provides one or more services to components of system 100. For example, server 108 may perform certain functions or tasks requested by users 102 using devices 104. Application 114 may execute on server 108 to perform these functions or tasks. For example, server 108 may perform certain calculations and/or determination when executing application 114. Server 108 may communicate the results of the calculations and/or determination to device 104 and network 106. This disclosure contemplates server 108 including any suitable number of devices and any suitable hardware and/or software for executing application 114.

Sever 108 may also be susceptible to security vulnerabilities. For example, when server 108 is compromised by a malicious user, server 108 may begin performing undesired services on behalf of that user. Additionally, server 108 may communicate to malicious users the results of services performed on behalf of legitimate users 102. These security vulnerabilities in server 108 may be difficult to detect.

Server 108 may be any component that performs a service or function for a component of system 100. Server 108 may include any suitable hardware and/or software for performing the service or function. For example, server 108 may include a hardware processor, a memory, and software instructions that when executed, perform the function or service. Each server 108 may include separate hardware and/or software from another component of system 100. In certain instances, server 108 may receive requests from devices 110 and perform certain services and/or functions in response to those requests. This disclosure contemplates system 100 including any suitable number of servers 108. For example, system 100 may include hundreds of thousands of servers 108. Each server 108 may perform a specific service and/or function.

Database 110 stores data and/or information used by other components of system 100. For example, devices 104 and/or server 108 may store and/or retrieve information from database 110. Devices 104 and server 108 may use this information to perform certain functions when executing application 114. Database 110 may also execute application 114. Application 114 may govern the type of data stored in database 110 for application 114 and the structure of that data when stored in database 110.

Security vulnerabilities may exist in database 110. For example, malicious users may retrieve data and information from database 110 or write bad data to database 110. Database 110 may receive and process illegitimate queries from malicious users and communicate results of these queries to the malicious users. Once established, these security vulnerabilities may be difficult to detect.

Application 114, with any software application that executes on one or more components of system 100. Application 114 may be designed to execute on multiple portions or tiers of a multi-tier platform. Application 114 may be developed using computer source code. When application 114 is executing on a particular portion or tier of system 100, a portion of source code dedicated to that portion or tier of system 100 executes. When application 114 is executing on a particular tier of system 100, the source code may log certain attributes related to the execution of application 114 on that tier. The log may include messages generated or communicated by or to application 114. The log may also indicate information provided by user 102 and communicated through system 100. The log may also include details about the functions and/or features performed by the tier when executing application 114.

Each tier of system 100 may maintain its own logs. These logs may contain the details concerning the operation of the particular tier of system 100 when executing application 114. Due to the architecture of a multitier platform, such as system 100, it may be difficult to detect security vulnerabilities that exist in system 100. When a security vulnerability is believed to exist, multiple teams may be directed to detect or determine the cause of the security vulnerability. Each team may be responsible for handling a particular tier of system 100. Thus, each team reviews a log for its particular tier of system 100 to determine whether a security vulnerability exists in the tier. Each team has limited visibility into the functions of the other tiers and the interactions with the other tiers, which can result in security vulnerabilities being misdiagnosed or missed. Additionally, the logging across tiers of system 100 may not be uniform and so certain teams may not have sufficient information to diagnose a security vulnerability in their respective tiers. As a result, the security vulnerabilities may go undetected and/or untreated.

Security tool 112 improves the detection of security vulnerabilities in system 100. Generally, security tool 112 inserts logging code into the source code of application 114 to log the appropriate attributes for particular tiers of system 100. In this manner, security vulnerabilities in different tiers of system 100 may be detected and resolved in certain embodiments. Security tool 112 includes a processor 116 and memory 118. This disclosure contemplates processor 116 and memory 118 being configured to perform any of the functions of security tool 112 described herein.

Processor 116 is any electronic circuitry, including, but not limited to microprocessors, application specific integrated circuits (ASIC), application specific instruction set processor (ASIP), and/or state machines, that communicatively couples to memory 118 and controls the operation of security tool 112. Processor 116 may be 8-bit, 16-bit, 32-bit, 64-bit or of any other suitable architecture. Processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 116 may include other hardware that operates software to control and process information. Processor 116 executes software stored on memory to perform any of the functions described herein. Processor 116 controls the operation and administration of security tool 112 by processing information received from devices 104, network 106, and memory 118. Processor 116 may be a programmable logic device, a microcontroller, a microprocessor, any suitable processing device, or any suitable combination of the preceding. Processor 116 is not limited to a single processing device and may encompass multiple processing devices.

Memory 118 may store, either permanently or temporarily, data, operational software, or other information for processor 116. Memory 118 may include any one or a combination of volatile or non-volatile local or remote devices suitable for storing information. For example, memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 118, a disk, a CD, or a flash drive. In particular embodiments, the software may include an application executable by processor 116 to perform one or more of the functions described herein.

Security tool 112 stores one or more logging rules 120. Logging rules 120 govern the types of logging that should be performed in each tier of system 100. For example, logging rules 120 may indicate the attributes that should and should not be logged in a particular tier of system 100. Logging rules 120 may indicate that on user device 104, user input, user commands, and device properties should be logged. Logging rules 120 may indicate that incoming traffic and outbound traffic should be logged for network 106. Logging rules 120 may indicate that queries and results should be logged for database 110. Logging rules 120 may indicate that incoming request, function calls, and outbound results be logged for server 108. Security tool 112 may apply logging rules 120 to determine the attributes that should be logged for a particular tier.

Security tool 112 receives source code 122 for application 114. In certain embodiments, security tool 112 receives source code 112 by receiving application 114 and then decompiling application 114 to produce source code 122. In other embodiments, security 112 receives source code 122 directly and does not decompile application 114. Source code 122 includes software code, that when executed, performs the function of application of 114. Source code 122 may be segmented into portions dedicated to each tier of system 100. When application 114 is executing on a particular tier of system 100, that portion of source code 122 dedicated to that tier may be executed. In this manner, source code 122 may be segmented for the various tiers of system 100.

Security tool 112 inserts logging code 124 into source code 122 such that the appropriate attributes are logged when source code 122 is executing in a particular tier of system 100. Generally, security tool 112 inserts logging code 124 between the entry point and exit point of particular segments of source code 122. In this manner, when the portion of source code 122 for a particular tier is executed, the logging code 124 for that particular tier is also executed and the appropriate attributes for the tier are logged.

After inserting logging code 124 into source code 122, security tool 112 may recompile source code 122 to form application 126. Application 126 may perform the same functions and features of application 114 except application 126 may also perform logging based on the inserted logging code 124. When application 126 is executed on the various tiers of system 100, appropriate logging for those tiers may be performed and security vulnerabilities in those tiers may be more easily detected. Although FIG. 1 shows the components of system 100 executing application 114, this has been done for purposes of clarity. It is desired that application 126, which includes logging code 124 be executed on the components of system 100 so that security vulnerabilities can be more easily detected and resolved.

FIG. 2 illustrates an example security tool 112 of the system 100 of FIG. 1. Generally, security tool 112 adjusts the source code 122 of an application 114 according to logging rules 120. In certain embodiments, the improved logs produced by the modified source code 122 improves the detection of security vulnerabilities in system 100.

Security tool 112 receives application 114. Generally, application 114 is designed to execute on multiple tiers of system 100. For example, application 114 may execute on a user device 104, a network 106, a server 108, and/or a database 110. Each tier of system 100 may be vulnerable to distinct security vulnerabilities that compromise the security of system 100. If a security vulnerability exists in a particular tier, then that tier may expose system 100 to risks when executing application 114. In a multitier platform, such as system 100, detection of security vulnerabilities may be difficult because different teams may be responsible for different tiers of system 100. As a result, each team has limited visibility into the functions of the other tiers and the interactions with other tiers. These teams may not have sufficient information to diagnose a security vulnerability in their respective tiers.

Security tool 112 improves security vulnerability detection in system 100 by adjusting the source code 122 of application 114. In certain embodiments, security tool 112 decompiles application 114 to produce source code 122. In other embodiments, security tool 112 receives source code 122 from another component of system 100. Source code 122 may be segmented based on the various tiers in system 100. In the illustrated example of FIG. 2, source code 122 is segmented into three portions for three different tiers. The first portion is for a first tier 202A, the second portion is for a second tier 202B, and the third portion is for a third tier 202C. This disclosure contemplates source code 122 being segmented into any suitable number of portions for any suitable number of tiers 202.

Each segment for each tier 202 includes an entry point 204 and an exit point 206. For example, the segment for tier 202A includes entry point 204A and exit point 206A. The segment for tier 202B includes entry point 204B and exit point 206B. The segment for tier 202C includes entry point 204C and exit point 206C. An entry point 204 is a point in source code 122 where execution of the code for a particular segment begins. Exit point 206 are points in source code 122 where execution of the code for a particular segment ends. Thus, when application 114 is executing on a particular tier 202 of system 100, execution begins at entry point 204 for that tier 202 and ends at exit point 206 for that tier 202. The software code between the entry point 204 and the exit point 206 is executed in that tier 202. In the illustrated example of FIG. 2, when application 114 is executing in tier 202A, the code from entry point 204A to exit point 206A is executed. When application 114 is executing in tier 202B, the software code between entry point 204B and exit point 206B is executed. When application 114 is executing in tier 202C, the software code from entry point 204C to exit point 206C is executed. In this manner, application 114 is designed to execute on multiple tiers 202 and to perform different functions on each tier 202.

Security tool 112 adjusts source code 122 based on logging rules 120. Logging rules 120 may indicate the attributes that should be logged when application 114 is executing in a particular tier 202 of system 100. Security tool 112 uses logging rules 120 to determine these attributes for each tier 202. Security tool 112 then inserts logging code 124 into various portions of source code 122 for each tier 202 that causes these attributes to be logged when the logging code 124 is executed. In the example of FIG. 2, source code 122 inserts logging code 124A between entry point 204A and exit point 206A. Security tool 112 inserts logging code 124B between entry point 204B and exit point 206B. Security tool 112 inserts logging code 124C between entry point 204C and exit point 206C. In this manner, logging code 124A is executed when application 124 is executed in tier 202A. Logging code 124B is executed when application 114 is executed on tier 202B. And logging code 124C is executed when application 114 is executed in tier 202C. When executed, logging code 124A will log the attributes that logging rules 120 indicate should be logged when application 114 is executing on tier 202A. When executed, logging code 124B will log the attributes that logging rules 120 indicate should be logged when application 114 is executing on tier 202B. When executed, logging code 124C will log the attributes that logging rules 120 indicate should be logged when application 114 is executing on tier 202C.

Security tool 112 may maintain the logs 210 generated by executing logging code 124 in certain embodiments. In the example of FIG. 2, security tool 112 maintains logs 210A, 210B, and 210C. Log 210A includes the attributes 212A that are logged when application 114 is executing on tier 202A. For example, if tier 202A is a user device 104, then attributes 212A may include user input, user commands, and traffic to or from device 104. Log 210B includes the attributes 212B that are logged when application 114 is executed on tier 202B. If tier 202B is a network 106, then attributes 212B may include incoming and outbound traffic. Log 210C includes attributes 212C that are logged when application 114 is executed on tier 202C. If tier 202C is a database 110, then attributed 212C may include database queries and database responses. Logs 210 may be maintained by security tool 112 and/or by other components of system 100. For example, if tier 202A is a user device 104, then log 210A may be maintained by the user device 104. If tier 202B is a network 106, then log 210B may be maintained by a component of network 106. If tier 202C is a database 110, then log 210C may be maintained by database 110.

Logging rules 120 may also indicate attributes 212 that should not be logged in certain tiers 202 of system 100. For example, logging rules 120 may indicate that attributes 212B should not be logged when application is executing on tier 202A. As a result, logging code 124A may indicate that attributes 212B should not be logged. When application 114 is executing on tier 202A, attributes 212A may be logged in log 210A, but attributes 212B may not be logged because logging code 124A excludes attributes 212B from being logged when application 114 is executing on tier 202A. This disclosure contemplates any suitable attributes 212 being logged when application 114 is executing on a tier 202.

In certain embodiments, logs 210 may be analyzed to determine whether security vulnerabilities exist in a particular tier 202 of system 100. For example, if attributes 212A indicate outbound traffic from a device 104 to a key logging server, then log 210A may indicate that a device 104 has been compromised. As another example, if attributes 212B indicate incoming network traffic from an unknown device or server, then log 210B may indicate a security vulnerability on the network 106. As yet another example, if attributes 212C indicate that unrequested data was communicated from database 110, then log 210C may indicate a security vulnerability in database 110. In this manner, logs 210 may be analyzed to determine the security vulnerabilities in system 100.

In particular embodiments, logging code 124 may add in log 210 an identifier 220 for processes that are executing when application 114 executes on a particular tier 202 of system 100. These identifiers 220 can be used to distinguish the various processes executing on a tier when application 114 is executing on that tier 202. In the example of FIG. 2, logging code 124A adds identifier 220A to log 210A, logging code 124B adds identifier 220B to log 210B, and logging code 124C adds identifier 220C to log 210C.

In some embodiments, logging code 124 may further indicate certain information that should not be logged in logs 210B. For example, logging code 124 may indicate that personal information should not be logged when application 114 is executing on a tier 202. In the example of FIG. 2, logging code 124B indicates that personal information 214 should not be logged when application 114 is executing on tier 202B. Personal information 214 may include any information that identifies a particular user 102 in system 100. For example, personal information 214 may include a user's 102 name, address, birthday, occupation, etc. When application 114 is executing on tier 202B, security tool 112 may review the attributes 212B that are being logged in log 210B. If security tool 112 detects personal information 214 in attributes 212B, security tool 112 may remove personal information 214 from attributes 212B. In this manner, personal information 214 is kept out of log 210B. When log 210B is being reviewed, the personal information 214 is not revealed to the reviewer, thus improving the security for users 102.

In certain embodiments, logging code 124 may indicate a format 208 for a log 210. The format 208 may be indicated by logging rules 120. When generating and/or inserting logging code 124, security 112 may select a format 208 based on logging rules 120. The logging code 124 may indicate the format 208. When application 114 is executing on a tier 202, the log 210 corresponding to that logging code 124 may be of the selected format 208. In the example of FIG. 2, logging code 124A indicates a format 208A, logging coded 124B indicates a format 208B, and logging code 124C indicates a format 208C. Correspondingly, log 210A is a format 208A, log 210B is a format 208B, and log 210C is a format 208C. Security tool 112 may have generated the logs 210 based on the selected format 208.

In particular embodiments, execution of logging code 124 may result in the detection of errors 216 that occur when application 114 is executing on a tier 202. For example, logging code 124A may, when executed, detect error 216 when application 114 is executing on tier 202A. Security tool 112 may detect error 216 and generate and communicate an alert 218 to alert others of error 216. For example, when application 114 is executing on a user device 104, application 114 may crash. Logging code 124A may detect the crash and alert security tool 112. In response, security tool 112 may generate and communicate alert 218 to alert administrators and/or developers of the crash on user device 104.

In some embodiments, security tool 112 generates a report 222 that includes information about the various logs 210. For example, report 222 may include the attributes 212 and identifiers 220 included in each log 210. Security tool 112 may communicate report 222 to administrators of system 100 so that logs 210 may be reviewed. Report 222 may include a summary of the logs 210 that may be quickly reviewed to determine whether logs 210 should be more closely reviewed to detect security vulnerabilities in system 100.

FIG. 3 is a flow chart illustrating a method 300 for improving security using the system 100 of FIG. 1. In particular embodiments, security tool 112 performs the steps of method 300. By performing method 300, security vulnerabilities are more easily detected in system 100.

Security tool 112 begins by storing a plurality of logging rules 120 in step 302. The logging rules 120 may indicate attributes 212 that should be logged when an application 114/126 is executing in different tiers 202 of the system 100. Security tool 112 receives source code 122 for an application 114 in step 304. In certain embodiments, security tool 112 receives the application 114 and decompiles the application 114 to obtain the source code 122. In step 306, security tool 112 detects in the source code 122 an entry point 204 and an exit point 206 for a tier 202.

Security tool 112 determines the first attribute 212 to be logged during execution in the tier 202 in step 308. In step 310, security tool 112 determines a second attribute 212 not to be logged during execution in the tier 202. In response to these determinations, security tool 112 inserts logging code 124 between the entry point 204 and the exit point 206 in step 312. The logging code 124 may indicate that the first attribute 212 should be logged and that the second attribute 212 should not be logged. As a result, when the application 114/126 is executing in the tier 202, the logging code 124 will execute and cause the first attribute 212 to be logged, and the second attribute 212 not to be logged.

Modifications, additions, or omissions may be made to method 300 depicted in FIG. 3. Method 300 may include more, fewer, or other steps. For example, steps may be performed in parallel or in any suitable order. While discussed as security tool 112 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store a plurality of logging rules, each logging rule assigned to a different tier of a multi-tier platform, wherein:
a first logging rule from among the plurality of logging rules is assigned to a first tier of the multi-tier platform, the first tier comprises a user device;
the first logging rule indicates a first set of attributes that should be logged with respect to the user device and a second set of attributes that should not be logged with respect to the user device, the first set of attributes comprises user input to the user device and network traffic to and from the user device, and the second set of attributes is associated with tiers of the multi-tier platform except the user device;
a second logging rule from among the plurality of logging rules is assigned to a second tier of the multi-tier platform, the second tier comprises a network device configured to facilitate data communication among the tiers of the multi-tier platform;
the second logging rule indicates a third set of attributes that should be logged with respect to the network device and a fourth set of attributes that should not be logged with respect to the network device, the third set of attributes comprises incoming and outbound network traffic with respect to the network device, the fourth set of attributes is associated with the tiers of the multi-tier platform except the network device;
a third logging rule from among the plurality of logging rules is assigned to a third tier of the multi-tier platform, the third tier comprises a database configured to store data used by the multi-tier platform;
the third logging rule indicates that a fifth set of attributes that should be logged with respect to the database and a sixth set of attributes that should not be logged with respect to the database, the fifth set of attributes comprises database queries and database responses, the sixth set of attributes is associated with the tiers of the multi-tier platform except the database;
a fourth logging rule from among the plurality of logging rules is assigned to a fourth tier of the multi-tier platform, the fourth tier comprises a server;
the fourth logging rule indicates that a seventh set of attributes that should be logged with respect to the server and an eighth set of attributes that should not be logged with respect to the server, the seventh set of attributes comprises incoming requests, software function calls, and outbound results associated with the server, the eighth set of attributes is associated with the tiers of the multi-tier platform except the server; and
a hardware processor communicatively coupled to the memory, the hardware processor configured to:
receive source code for an application configured to execute on a plurality of tiers of the multi-tier platform, wherein:
the source code is segmented into a plurality of portions, each dedicated to a particular tier of the multi-tier platform such that:
a first portion of the source code is dedicated to the user device, when the first portion of the source code is executed, the application is executed on the user device;
a second portion of the source code is dedicated to the network device, when the second portion of the source code is executed, the application is executed on the network device;
a third portion of the source code is dedicated to the database, when the third portion of the source code is executed, the application is executed on the database;
a fourth portion of the source code is dedicated to the server, when the fourth portion of the source code is executed, the application is executed on the server;
detect, within the source code, a first entry point and a first exit point of the first portion of the source code dedicated to the user device;
determine, based on the plurality of logging rules, the first set of attributes that is to be logged during execution of the application in the user device and the second set of attributes that is not to be logged during execution of the application in the user device, insert, between the first entry point and the first exit point in the source code, first logging code that, when executed, logs the first set of attributes and instructs that the second set of attributes to be excluded from being logged;

determine that the logged first set of attributes indicates outbound network traffic from the user device to a key logging device;

in response to determining that the logged first set of attributes indicates outbound network traffic from the user device to the key logging device, generate a first log file indicating that the user device is associated with a security vulnerability;

determine, based on the plurality of logging rules, a second entry point and a second exit point of the second portion of the source code dedicated to the network device;

insert, between the second entry point and the second exit point in the source code, second logging code that, when executed, logs the third set of attributes and instructs that the fourth set of attributes to be excluded from being logged;

determine that the logged third set of attributes indicates incoming network traffic from an unknown device to the network device;

in response to determining that the logged third set of attributes indicates incoming network traffic from the unknown device to the network device, generate a second log file indicating that the network device is associated with a security vulnerability;

determine, based on the plurality of logging rules, a third entry point and a third exit point of the third portion of the source code dedicated to the database;

insert, between the third entry point and the third exit point in the source code, third logging code that, when executed, logs the fifth set of attributes and instructs that the sixth set of attributes to be excluded from being logged;

determine that the logged fifth set of attributes indicates unrequested data is communicated from the database;

in response to determining that the logged fifth set of attributes indicates unrequested data is communicated from the database, generate a third log file indicating that the database is associated with a security vulnerability;

determine, based on the plurality of logging rules, a fourth entry point and a fourth exit point of the fourth portion of the source code dedicated to the server;

insert, between the fourth entry point and the fourth exit point in the source code, fourth logging code that, when executed, logs the seventh set of attributes and instructs that the eighth set of attributes to be excluded from being logged;

determine that the logged seventh set of attributes indicates an error with respect to the server;

in response to determining that the logged fifth set of attributes indicates the error with respect to the server, communicate an alert indicating the error.

2. The apparatus of claim 1, wherein the logging code, when executed, further adds an identifier for each process that executes in the tier.

3. The apparatus of claim 1, wherein the hardware processor is further configured to execute the logging code to:

detect personal information that is within a second attribute associated with the first tier; and remove the personal information from being logged.

4. The apparatus of claim 1, wherein the hardware processor is further configured to:

select a format based on the tier and the plurality of logging rules; and generate a log of the selected format.

5. The apparatus of claim 1, wherein the hardware processor is further configured to execute the logging code to:

detect an error that occurs during execution of the source code in the tier; and communicate an alert indicating the error.

6. The apparatus of claim 1, wherein the hardware processor is further configured to:

detect, within the source code, a second entry point and a second exit point for a second tier of the plurality of tiers;

determine, based on the plurality of logging rules, a third attribute that is to be logged during execution in the second tier; and insert, between the second entry point and the second exit point in the source code, logging code that, when executed, logs the third attribute.

7. The apparatus of claim 1, wherein the hardware processor is further configured to generate a report indicating the first attribute.

8. A method comprising:

storing, by a memory, a plurality of logging rules, each logging rule assigned to a different tier of a multi-tier platform, wherein:

a first logging rule from among the plurality of logging rules is assigned to a first tier of the multi-tier platform, the first tier comprises a user device;

the first logging rule indicates a first set of attributes that should be logged with respect to the user device and a second set of attributes that should not be logged with respect to the user device, user device, the first set of attributes comprises user input to the user device and network traffic to and from the user device, and the second set of attributes is associated with tiers of the multi-tier platform except the user device;

a second logging rule from along the plurality of logging rules is assigned to a second tier of the multi-tier platform, the second tier comprises a network device configured to facilitate data communication among the tiers of the multi-tier platform;

the second logging rule indicates a third set of attributes that should be logged with respect to the network device and a fourth set of attributes that should not be logged with respect to the network device, the third set of attributes comprises incoming and outbound network traffic with respect to the network device, the fourth set of attributes is associated with the tiers of the multi-tier platform except the network device;

a third logging rule from among the plurality of logging rules is assigned to a third tier of the multi-tier platform, the third tier comprises a database configured to store data used by the multi-tier platform;

the third logging rule indicates that a fifth set of attributes that should be logged with respect to the database and a sixth set of attributes that should not be logged with respect to the database, the fifth set of attributes comprises database queries and database responses, the sixth set of attributes is associated with the tiers of the multi-tier platform except the database;

a fourth logging rule from among the plurality of logging rules is assigned to a fourth tier of the multi-tier platform, the fourth tier comprises a server;

the fourth logging rule indicates that a seventh set of attributes that should be logged with respect to the server and an eighth set of attributes that should not be logged with respect to the server, the seventh set of attributes comprises incoming requests, software function calls, and outbound results associated with the server, the eighth set of attributes is associated with the tiers of the multi-tier platform except the server; and receiving, by a hardware processor communicatively coupled to the memory, source code for an application configured to execute on a plurality of tiers of the multi-tier platform, wherein:

the source code is segmented into a plurality of portions, each dedicated to a particular tier of the multi-tier platform such that:

a first portion of the source code is dedicated to the user device, when the first portion of the source code is executed, the application is executed on the user device;

a second portion of the source code is dedicated to the network device, when the second portion of the source code is executed, the application is executed on the network device;

a third portion of the source code is dedicated to the database, when the third portion of the source code is executed, the application is executed on the database;

a fourth portion of the source code is dedicated to the server, when the fourth portion of the source code is executed, the application is executed on the server;

detecting, by the processor, within the source code, a first entry point and a first exit point of the first portion of the source code dedicated to the user device;

determining, by the processor, based on the plurality of logging rules, the first set of attributes that is to be logged during execution of the application in the user device and the second set of attributes that is not to be logged during execution of the application in the user device, inserting, by the processor, between the first entry point and the first exit point in the source code, first logging code that, when executed, logs the first set of attributes and instructs that the second set of attributes to be excluded from being logged;

determining that the logged first set of attributes indicates outbound network traffic from the user device to a key logging device;

in response to determining that the logged first set of attributes indicates outbound network traffic from the user device to the key logging device, generating a first log file indicating that the user device is associated with a security vulnerability;

determining, based on the plurality of logging rules, a second entry point and a second exit point of the second portion of the source code dedicated to the network device;

inserting, between the second entry point and the second exit point in the source code, second logging code that, when executed, logs the third set of attributes and instructs that the fourth set of attributes to be excluded from being logged;

determining that the logged third set of attributes indicates incoming network traffic from an unknown device to the network device;

in response to determining that the logged third set of attributes indicates incoming network traffic from the unknown device to the network device, generating a second log file indicating that the network device is associated with a security vulnerability;

determining, based on the plurality of logging rules, a third entry point and a third exit point of the third portion of the source code dedicated to the database;

inserting, between the third entry point and the third exit point in the source code, third logging code that, when executed, logs the fifth set of attributes and instructs that the sixth set of attributes to be excluded from being logged;

determining that the logged fifth set of attributes indicates unrequested data is communicated from the database;

in response to determining that the logged fifth set of attributes indicates unrequested data is communicated from the database, generating a third log file indicating that the database is associated with a security vulnerability;

determining, based on the plurality of logging rules, a fourth entry point and a fourth exit point of the fourth portion of the source code dedicated to the server;

inserting, between the fourth entry point and the fourth exit point in the source code, fourth logging code that, when executed, logs the seventh set of attributes and instructs that the eighth set of attributes to be excluded from being logged;

determining that the logged seventh set of attributes indicates an error with respect to the server;

in response to determining that the logged fifth set of attributes indicates the error with respect to the server, communicating an alert indicating the error.

9. The method of claim 8, wherein the logging code, when executed, further adds an identifier for each process that executes in the tier.

10. The method of claim 8, further comprising executing, by the hardware processor, the logging code to:
detect personal information that is within a second attribute associated with the first tier; and
remove the personal information from being logged.

11. The method of claim 8, further comprising:
selecting, by the processor, a format based on the tier and the plurality of logging rules; and
generating, by the processor, a log of the selected format.

12. The method of claim 8, further comprising executing, by the processor, the logging code to:
detect an error that occurs during execution of the source code in the tier; and
communicate an alert indicating the error.

13. The method of claim 8, further comprising:
detecting, by the processor, within the source code, a second entry point and a second exit point for a second tier of the plurality of tiers;
determining, by the processor, based on the plurality of logging rules, a third attribute that is to be logged during execution in the second tier; and
inserting, by the processor, between the second entry point and the second exit point in the source code, logging code that, when executed, logs the third attribute.

14. The method of claim 8, further comprising generating, by the processor, a report indicating the first attribute.

15. A system comprising:
a first tier comprising a user device;
a second tier comprising a network;
a third tier comprising a database; and
a security tool configured to:
store a plurality of logging rules, each logging rule assigned to one of the first, second, fourth, and third tiers, wherein:
a first logging rule from among the plurality of logging rules is assigned to a first tier of the multi-tier platform, the first tier comprises a user device;
the first logging rule indicates a first set of attributes that should be logged with respect to the user device and a second set of attributes that should not be logged with respect to the user device, the first set of attributes comprises user input to the user device and network traffic to and from the user device, and the second set of attributes is associated with tiers of the multi-tier platform except the user device;
a second logging rule from along the plurality of logging rules is assigned to a second tier of the multi-tier platform, the second tier comprises a network device configured to facilitate data communication among the tiers of the multi-tier platform;
the second logging rule indicates a third set of attributes that should be logged with respect to the network device and a fourth set of attributes that should not be logged with respect to the network device, the third set of attributes comprises incoming and outbound network traffic with respect to the network device, the fourth set of attributes is associated with the tiers of the multi-tier platform except the network device;
a third logging rule from among the plurality of logging rules is assigned to a third tier of the multi-tier platform, the third tier comprises a database configured to store data used by the multi-tier platform;
the third logging rule indicates that a fifth set of attributes that should be logged with respect to the database and a sixth set of attributes that should not be logged with respect to the database, the fifth set of attributes comprises database queries and database responses, the sixth set of attributes is associated with the tiers of the multi-tier platform except the database;
a fourth logging rule from among the plurality of logging rules is assigned to a fourth tier of the multi-tier platform, the fourth tier comprises a server;
the fourth logging rule indicates that a seventh set of attributes that should be logged with respect to the server and an eighth set of attributes that should not be logged with respect to the server, the seventh set of attributes comprises incoming requests, software function calls, and outbound results associated with the server, the eighth set of attributes is associated with the tiers of the multi-tier platform except the server; and
receive source code for an application configured to execute on the first, second, and third tiers, wherein:
the source code is segmented into a plurality of portions, each dedicated to a particular tier of the multi-tier platform such that:
a first portion of the source code is dedicated to the user device, when the first portion of the source code is executed, the application is executed on the user device;
a second portion of the source code is dedicated to the network device, when the second portion of the source code is executed, the application is executed on the network device;
a third portion of the source code is dedicated to the database, when the third portion of the source code is executed, the application is executed on the database;
a fourth portion of the source code is dedicated to the server, when the fourth portion of the source code is executed, the application is executed on the server;
detect, within the source code, a first entry point and a first exit point of the first portion of the source code dedicated to the user device;
determine, based on the plurality of logging rules, the first set of attributes that is to be logged during execution of the application in the user device and the second set of attributes that is not to be logged during execution of the application in the user device,
insert, between the first entry point and the first exit point in the source code, first logging code that, when executed, logs the first set of attributes and instructs that the second set of attributes to be excluded from being logged;
determine that the logged first set of attributes indicates outbound network traffic from the user device to a key logging device;
in response to determining that the logged first set of attributes indicates outbound network traffic from the user device to the key logging device, generate a first log file indicating that the user device is associated with a security vulnerability;
determine, based on the plurality of logging rules, a second entry point and a second exit point of the second portion of the source code dedicated to the network device;
insert, between the second entry point and the second exit point in the source code, second logging code that, when executed, logs the third set of attributes and instructs that the fourth set of attributes to be excluded from being logged;
determine that the logged third set of attributes indicates incoming network traffic from an unknown device to the network device;
in response to determining that the logged third set of attributes indicates incoming network traffic from the unknown device to the network device, generate a second log file indicating that the network device is associated with a security vulnerability;
determine, based on the plurality of logging rules, a third entry point and a third exit point of the third portion of the source code dedicated to the database;
insert, between the third entry point and the third exit point in the source code, third logging code that, when executed, logs the fifth set of attributes and instructs that the sixth set of attributes to be excluded from being logged;

determine that the logged fifth set of attributes indicates unrequested data is communicated from the database;

in response to determining that the logged fifth set of attributes indicates unrequested data is communicated from the database, generate a third log file indicating that the database is associated with a security vulnerability;

determine, based on the plurality of logging rules, a fourth entry point and a fourth exit point of the fourth portion of the source code dedicated to the server;

insert, between the fourth entry point and the fourth exit point in the source code, fourth logging code that, when executed, logs the seventh set of attributes and instructs that the eighth set of attributes to be excluded from being logged;

determine that the logged seventh set of attributes indicates an error with respect to the server;

in response to determining that the logged fifth set of attributes indicates the error with respect to the server, communicate an alert indicating the error.

16. The system of claim 15, wherein the logging code, when executed, further adds an identifier for each process that executes in the first tier.

17. The system of claim 15, wherein the security tool is further configured to execute the logging code to:

detect personal information that is within a second attribute associated with the first tier; and remove the personal information from being logged.

18. The system of claim 15, wherein the security tool is further configured to:

select a format based on the first tier and the plurality of logging rules; and generate a log of the selected format.

19. The system of claim 15, wherein the security tool is further configured to execute the logging code to:

detect an error that occurs during execution of the source code in the first tier; and communicate an alert indicating the error.

20. The system of claim 15, wherein the security tool is further configured to:

detect, within the source code, a second entry point and a second exit point for the second tier;

determine, based on the plurality of logging rules, a third attribute that is to be logged during execution in the second tier; and insert, between the second entry point and the second exit point in the source code, logging code that, when executed, logs the third attribute.

* * * * *